United States Patent [19]

Houser et al.

[11] 3,847,584

[45] Nov. 12, 1974

[54] AUTOMATIC VARIABLE PHASE SHIFT CONTROL FOR WELDING GLASS SHEETS

[75] Inventors: Lloyd Houser; William G. Jeffries, both of Lincoln, Ill.

[73] Assignee: PPG Industries, Inc., Pittsburgh, Pa.

[22] Filed: May 24, 1973

[21] Appl. No.: 363,681

[52] U.S. Cl............................ 65/40, 65/58, 65/152, 65/DIG. 4
[51] Int. Cl............................................ C03b 23/24
[58] Field of Search..... 65/58, 40, 152, 156, DIG. 4

[56] References Cited
UNITED STATES PATENTS
| | | | |
|---|---|---|---|
| 2,394,051 | 2/1946 | Guyer et al. | 65/DIG. 4 |
| 2,857,501 | 10/1958 | Nitsche | 65/152 X |
| 3,359,089 | 12/1967 | Gidwani | 65/58 X |

*Primary Examiner*—Arthur D. Kellogg
*Attorney, Agent, or Firm*—Thomas F. Shanahan

[57] ABSTRACT

A method and apparatus for electrically working glass to fuse the marginal edge portion of one glass sheet to that of another glass sheet to form a double-glazed unit, wherein the marginal edge portion of the one sheet is cyclically heated to the desired fusing temperature by means of a controlled predetermined current flow. The welding current is applied to each of the side edges in turn of the one glass sheet in a first heating cycle, the current applied to each edge being automatically controlled through a series of four or more poteniometers which are selected in a timed sequence to produce a desired pattern of current flow, and thus a predetermined heating pattern in the selected edge, whereby the edges are gradually and uniformly brought up to the desired temperature. Each potentiometer is adjustable to provide a phase angle at which the alternating current voltage from the source is applied to the glass sheet whereby the sequencing of the four or more potentiometers produces current flow to the glass edge being heated at varying phase angles to vary the effective welding current through a desired heat curve. The last potentiometer in the series may be a master potentiometer where the controller dwells until a maximum selected current level corresponding to the desired temperature level in the marginal edge portion being heated is measured. Thereafter, the welding current is transferred to the next side of the glass sheet and the control system is again sequenced through the same series of potentiometers until the desired current level is reached. Similarly, the third and fourth sides of the glass sheet are each heated along the selected heat curve to complete a first cycle of heating. The abovedescribed sequencing of the series of potentiometers is repeated for each side of the window unit through a second cycle of the weld. An additional five cycles of heating may then be provided through additional preset current controlling potentiometers to achieve the desired welding. Finally, means are provided to permit selective skipping of all or portions of the heating cycles.

24 Claims, 8 Drawing Figures

AUTOMATIC VARIABLE PHASE SHIFT CONTROL FOR WELDING GLASS SHEETS

BACKGROUND OF THE INVENTION

The present invention relates, in general, to electric glass working, and more particularly to a novel method of heating the marginal edge portion of a glass sheet electrically in order to weld it to another glass sheet to form a multiple glazing unit.

In the manufacture of double glazed window units, it is well-known that such units may be made by uniting the margins of an assembly of glass sheets with a continuous peripheral weld, the central regions of the sheets which are bounded by the continuous weld being pulled apart while the welded periphery is soft to establish a desired spacing between the sheets. In the process of manufacturing such all-glass multiple glazing units, the two glass sheets are first carefully washed, dried, pre-heated and assembled at a welding station one above the other. An electrically conductive stripe is deposited on one of the sheets of glass, generally on the upper surface of the upper glass sheet to form a continuous peripheral electrical path. A plurality of electrodes, perferably placed at the corners of a rectangular window unit, are provided to direct a flow of electrical heating currents through selected portions of the stripe, causing it to be heated. The portions of the upper sheet underlying the strip are heated by the current flowing through the stripe until the glass attains a temperature at which the strip burns off. At this stage, the heated margins will have attained a temperature at which the glass is electrically conductive, so that heating currents from the electrodes now flow through the heated margins.

The corresponding margins of the lower sheet are heated by their close association with the upper sheet and, as the heating continues, heat transferred through the glass causes the margins of the upper sheet to soften and to sag into contacting relationship with the margins of the lower sheet. Heating is continued until the margins of both sheets are softened and run together to form a continuous peripheral weld uniting the assembled sheets.

Various modes of controlling the heating current supplied to the edges of the glass sheets have been utilized in the prior art. Thus, in U.S. Pat. No. 2,398,360 to Edwin M. Guyer et al., the applied current is either supplied to all four edges simultaneously. or in a step-by-step fashion to one side after another by switching the current from one pair of electrodes to another in sequence. In U.S. Pat. No. 2,394,051 to Guyer et al. a particular electric circuit with stepping switches to control the sequential heating of each of the four sides of a unit to be welded in the step-by-step method is disclosed. In U.S. Pat. No. 3,510,285 to Murray et al., a switching circuit is provided to permit current to flow alternately first through one pair of opposed edges of the glass sheet, and then through the other pair of opposed edges. In U.S. Pat. No. 3,628,935 to Jansson et al., the relay operation of the Murray et al. patent is eliminated and a saturable reactor circuit applies a polyphase voltage first to one pair of opposite edges and then the remaining pair of opposite edges. Finally, U.S. Pat. No. 3,726,658 to Banks provides an electrode arrangement whereby the current flows between diagonally opposed pairs of electrodes, the diagonals being shifted periodically to change the flow pattern, while heating all four sides of the glass sheet simultaneously.

Although the advantages as well as the shortcomings of these various modes of heating and welding a double glazed unit have been extensively discussed in the prior art, it has been found that in practice the provision of a simultaneous current flow to all four sides tends to accentuate any differences in heating rates along the different edges of the glass. This is because any variation that causes the electrical resistance along one marginal edge to differ materially from that of the remaining side edges causes a greater current flow through the low resistance edge and a lesser current flow in the remaining side edges. The marginal side edge receiving the higher current flow then becomes hotter and more conductive, increasing the current flow and thus the heating therein and producing a runaway effect. The use of ballast resistances and complex control systems have reduced this problem, but overall it has been found that the best approach is to sequentially heat adjacent single sides of the glass sheet and to regulate the current flow in each side so that uniform heating effects are obtained. In prior art systems of this type, however, it has been the practice to use either fixed current levels for each side, or to provide a variable controller which can be operated by an observer to obtain the desired results. Neither arrangement has been found to be satisfactory, the former system being unreliable, since it does not take into account variations in the glass sheets but merely applies a fixed voltage which may or may not produce the optimum heating, and the latter being unsatisfactory since it relies upon the subjective judgement and experience of the operator. In either case, the quality of the weld can vary from one unit to the next, and thus uniform results cannot be assured.

SUMMARY OF THE INVENTION

Accordingly, it is an object of the present invention to provide a system for automatically controlling heating currents which are applied sequentially to the marginal side edges of a sheet of glass, a varying current being applied to each side for a selected number of cycles, and thereafter a predetermined current being applied to each side for each of a plurality of subsequent cycles whereby the side edges are heated substantially uniformly to a welding temperature.

Briefly, in a preferred embodiment of the present invention a pair of rectangular glass sheets suitable for use in forming a multiple glazed windnow unit are cut so that an upper sheet is approximately one-fourth inch larger in both length and width than a lower glass sheet. The upper sheet is thus provided with marginal edge portions which extend beyond the corresponding edges of the lower sheet whereby when the margin of the upper sheet is heated to the proper temperature, the edges will bend downwardly to fuse with the corresponding edges of the lower sheet, the areas within the marginal edge portions being held in spaced relation to one another. The softened edge portions are thus joined by a continuous weld to form a double glazing.

To heat the glass sheet, a conductive stripe is deposited on, for example, the upper surface of the upper glass sheet at the marginal edge thereof to form a continuous peripheral electrical path. Suitable electrodes are placed at the corners of the rectangular unit in sufficient proximity to the upper glass sheet to enable a current to flow through the conductive stripe upon application of a suitable voltage to selected electrodes. The edge of the glass sheet is intensely heated by the current flow through the stripe, with the stripe burning off of the glass when the temperature reaches a sufficient level to allow the current to pass instead through the marginal edge of the glass itself.

An alternating current voltage of high potential is applied to only a part of the marginal edge at any time, and thus preferably is first applied between selected pairs of electrodes A, B, C, and D located at corresponding corners of the glass to heat the corresponding marginal edges of the glass. Thus, by selecting electrodes A and B, a current is passed through the stripe to heat the marginal portion of A–B of the glass. Thereafter, the alternating voltage is shifted to the next pair of electrodes B, C to heat the corresponding second marginal edge portion B–C, and so on, until each of the four marginal edge portions of the rectangular glass sheet have been heated. The successive heating of the four portions, or edges, making up the margin of the glass constitute a complete heating cycle. To maintain the desired control over the heat input to the glass, it is necessary to bring the marginal edge portions to their softened state gradually, through a number of successive cycles, with up to seven or more cycles making a complete welding operation.

The alternating current power is supplied to the electrodes by way of a power regulator which may include ignitrons or other power supply regulators capable of handling the high power requirements of glass welding. A novel control circuit is provided to set the phase angle at which the regulator ignitrons become conductive whereby the effective power and peak voltage applied to the marginal edge portions of the glass may be controlled over each cycle of the welding operation. Over at least the first two cycles the control circuit automatically varies this firing phase angle during the heating of each side of the glass so that an increasing current, following a desired and preselected heating curve, is produced in succession in each marginal edge portion of the glass. When the selected level of heating is reached in a given edge portion, this is sensed by a current sensitive circuit which triggers the control system to that the power supply is shifted to the next adjacent marginal edge portion. The controller then again sequences through the preselected variations in firing phase angle to produce the changing current level which gives the desired heating curve. Again, when the selected heating level is reached, the controller is sequenced to heat the third and then the fourth portions of the marginal edge to complete a first heating cycle.

A second automatically controlled cycle is provided in the preferred embodiment, this cycle being similar to the first in that again a first marginal edge portion is selected and the control system sequenced to provide an increasing current which follows the selected heating curve. When the predetermined maximum current level is reached for this second cycle, the system is stepped to the second marginal edge where an increasing current is again applied in the predetermined sequence. This is repeated for each marginal edge portion of the glass, completing the second cycle. If desired, additional heating cycles may be provided in which a varying phase shift is produced in the power regulator for each side of the glass in the manner of the first and second cycles. However, it has been found in practice that at the end of the second cycle the glass is approaching the desired temperature and such a variable heating pattern is not required for each of the marginal edge portions. Accordingly, in the present system a selected constant current level is applied to each of the marginal edge portions for each cycle, in turn, this single current level being obtained by selecting a fixed phase angle for the firing of the ignitron power supply.

The effective current applied to each of the marginal edge portions for the third cycle is determined by the setting of a single potentiometer which normally is not changed. Similarly, a different fixed current level may be provided for each subsequent cycle, by means of corresponding potentiometers each set for the effective current required in its cycle, with as many as seven cycles being provided. In each cycle, the setting of the corresponding potentiometer controls the phase angle at which the ignitrons or similar power regulators fire, thereby regulating the effective power supplied to the glass. Since the conductivity of the glass is dependent upon its temperature, each marginal edge portion may be brought up to a desired temperature level during each cycle by monitoring the current flow through the glass. When the current reaches a predetermined level corresponding to the desired approximate maximum temperature, current tripping means are utilized to override the controller circuit and step the system to the next marginal edge portion, thereby preventing over-heating of the glass sheet.

Variations in the foregoing heating mode can be produced, if desired, by providing a master potentiometer by which an operator can override or modify the preselected heating curve. In addition, means can be provided for skipping all or parts of any of the heating cycles, if it is found that such parts are not required to provide a high-quality weld. Further, the operation of the system may be varied in accordance with the length of the marginal edge portion being heated; thus, for example, if the glass sheet is rectangular, the longer sides of the sheet will need a different voltage and current level than will the end portions. Furthermore, the automatic system can be removed from its control function, allowing manual operation of the system, if desired.

BRIEF DESCRIPTION OF THE DRAWINGS

The foregoing and additional objects, features and advantages of the present invention will become apparent to those of skill in the art from a reading of the following detailed description of a preferred embodiment thereof, taken in conjunction with the accompanying drawings, in which:

FIGS. 6A and 7B are a partial schematic diagram of the relay network which controls the operation of the system of FIG. 1 and provides the automatic phase shift sequencing of the present invention.

DESCRIPTION OF A PREFERRED EMBODIMENT

Figure 1:
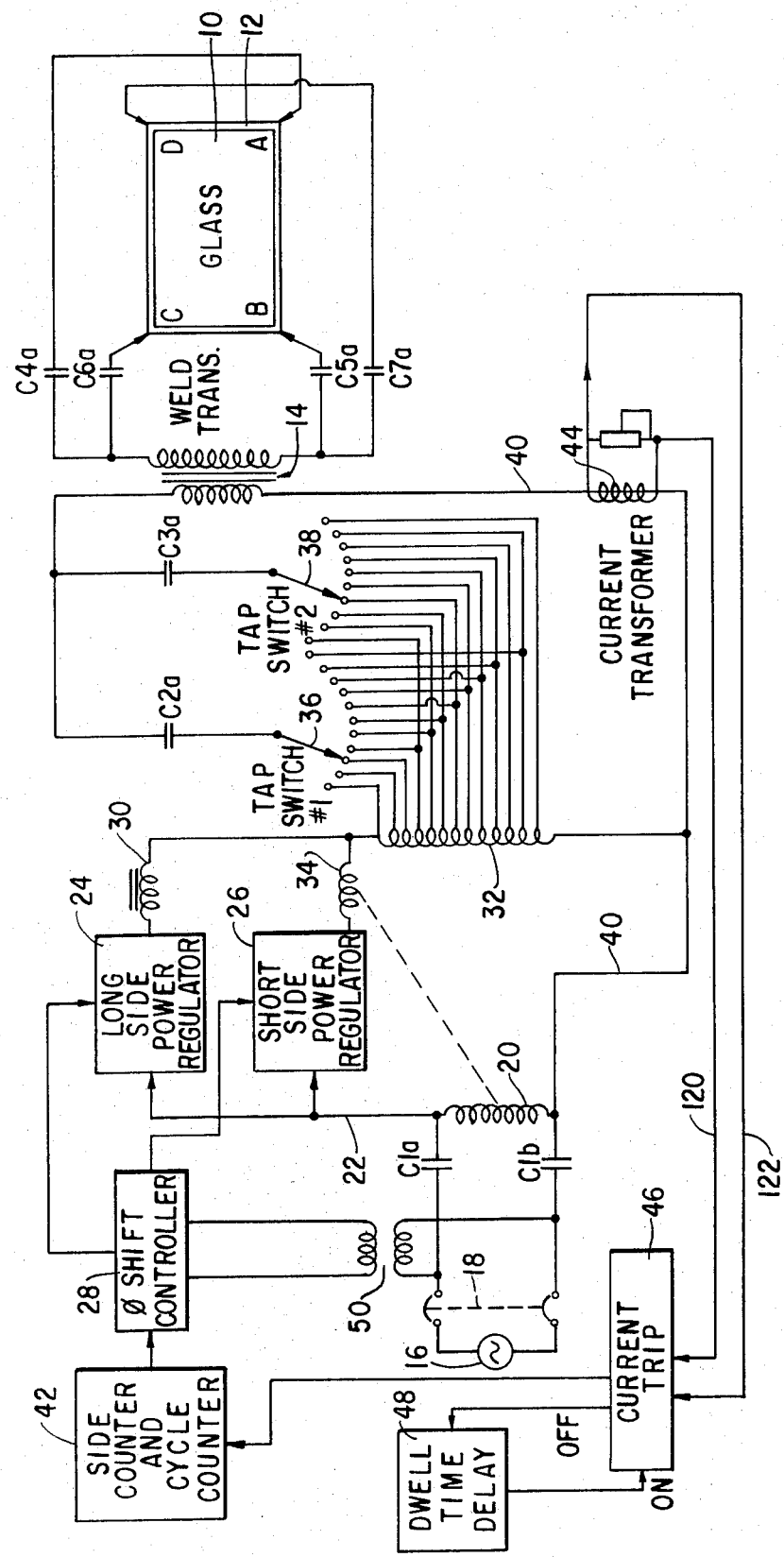
FIG. 1 is a diagrammatic illustration of the overall system of the present invention.

Referring now to FIG. 1 of the drawings, there is illustrated in diagrammactic form a system for automatically welding the corresponding marginal edges of a pair of parallel glass sheets. In accordance with this system, an upper glass sheet 10 is aligned over a smaller glass sheet (not shown) in closely spaced relation thereto. Prior to heating the edges of the glass for the welding process, both sheets are raised to an elevated temperature in the vicinity of the strain point of the glass. An electroconductive stripe 12 is coated on the upper surface of the upper layer of glass 10, immediately adjacent the edge thereof, and arranged to be proximate to four corner electrodes A, B, C, and D when the glass is in position for the welding operation. The conductive stripe, which is readily dissipated when the temperature of the glass reaches the point where the glass becomes electroconductive, provides an initial highly conductive path about the marginal portions of the glass sheet. The four electrodes A, B, C, and D are disposed sufficiently near the corners of the glass sheet as to produce a spark or arc across the short gap to enable current to flow between the electrodes through the electroconductive stripe. Preferably, each electrode is pointed diagonally in toward the adjacent corner and spaced therefrom by about ⅛ inch.

Power is applied to the four electrodes from the secondary of a conventional welding transformer 14 by way of normally open relay contacts, C4a, C5a, C6a, and C7a. Energization of appropriate corresponding relay coils permits selected pairs of these electrodes to be energized through closed contacts, whereby selected marginal edge portions of the glass sheet 10 may be heated. Thus, for example, to heat the marginal edge portion A-B of the sheet, the contacts C4a and C5a are closed so that electrodes A and B are energized by the welding transformer. In the present invention, the successive heating of the marginal edge portions A-B, B-C, C-D, and D-A constitutes a single heating cycle, with the edge portions A-B and C-D being the long sides of the glass and edge portions B-C and D-A being the short sides, or ends, of the sheets.

Power is applied to the system from a standard source 16 of 60 cycle alternating current which applies a voltage of approximately 460 volts to the system through a circuit breaker 18, through a normally open relay contact C1a and across the primary winding 20 of an Inductrol transformer. The upper end of primary winding 20 is connected by way of line 22 to supply alternating current power to a long side power regulator 24 and a short side power regulator 26 which provide controlled alternating current power for the welding electrodes. The phase angle of the output of regulator 24 is controlled by a phase shift controller 28, with the regulator output being applied through a reactor 30 to the upper end of a tapped autotransformer 32. Similarly, the phase angle of the output of power regulator 26 is controlled by phase shift controller 28 and is applied by way of the secondary winding 34 of the Inductrol transformer to the upper end of the autotransformer. The lower end of transformer 32 is connected to the lower end of Inductrol winding 20 to complete the power circuit.

The secondary winding 34 of the Inductrol transformer is connected in series with the output of regulator 26 and acts as a voltage bucking winding to reduce the current applied to the autotransformer. This secondary winding insures that the voltage supplied to the welding electrodes for the short side of the glass is reduced by an amount determined by the ratio of the primary and secondary windings 20 and 34, to prevent overheating of the short sides.

Autotransformer 32 has a plurality of taps which are connected to corresponding contacts on first and second tapping switches having adjustable arms 36 and 38. Arm 36 is moveable to feed a selected voltage level through a normally open relay contact C2 to the upper end of the primary winding of welding transformer 14. Similarly, the moveable arm 38 of the second tapping switch is connected, by way of normally open relay contact C3a, also to the upper end of the primary transformer 14. The lower end of this winding is connected by way of line 40 to the lower end of transformer 32, to the lower end of winding 20, and through normally open relay contact C1b to source 16.

The first and second tap switches permit different voltages to be applied to the welding electrodes on different heating cycles. Thus, for example, contact C2a is closed to supply the input voltage to transformer 14 during the first and second cycles of operation while contact C3a is closed for cycles 3 through 7. The first and second cycles occur when the glass is relatively cool, and thus a higher voltage level may be selected for use than would be the case for the remaining cycles, when the increased temperature of the glass has reduced its resistance. Typically, a voltage of from 199 v. to 460v may be selected by the tap switches, with the welding transformer stepping this voltage up to the voltages required for proper current flow. Thus, if the moveable arm 36 of tap switch 1 is set to the far left as viewed in FIG. 1, a voltage of 460 v would be applied to the primary of transformer 14, resulting in 22,000 v. appearing across the secondary thereof. Typically, however, tap switch 1 will be set to produce a voltage of approximately 17,000 v. across the selected electrodes, while tap switch 2 will be set to produce approximately 10,000 v. across the selected electrodes. These values are for the long sides of the glass sheet; the secondary winding 34 will reduce these values by an amount proportional to the reduced length of the short sides of the glass.

The phase shift controller 28 controls the power regulators 24 and 26 so as to produce effective currents in the glass being welded, which will raise the glass temperature in accordance with a predetermined selectable heating curve. This heating curve is produced by a plurality of phase angle controllers such as potentiometers which are sequentially selected in accordance with predetermined patterns whereby the power is supplied by the regulators in accordance with not only the cycle in which the system is operating but the marginal edge, or step, to which the voltage is being applied within a given cycle. The selection of the proper control sequence is accomplished by means of timers to be described and by means of suitable counters, which may be of the conventional relay type, and which detect and keep track of the cycle and step in which the system is operating.

In order to avoid overheating of the glass in any part of the cycle, current sensing means is provided, such as the current transformer 44, which senses the current flow through line 40 and thus is responsive to the current flowing through the glass sheet. Since this current is indicative of the temperature, the output of current transformer 44 may be used to operate a current tripping network 46 which determines when a preselected maximum current is flowing through the glass for any given cycle. When the detected current exceeds the value set for the cycle, the circuit operates to shift the counter circuit 42 to the next step, thereby shifting the heating operation to the next adjacent marginal side. A dwell time delay network 48 is responsive to the operation of the current trip network to prevent the next adjacent edge from being heated until all of the control relays have been reset.

Figure 2:
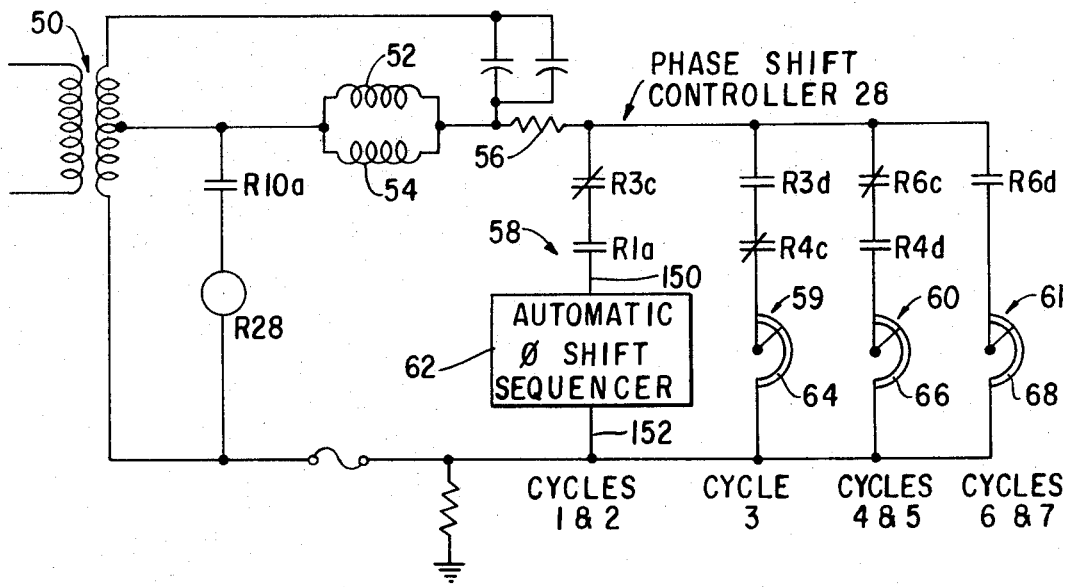
FIG. 2 is a diagrammatic and partial schematic illustration of the phase shift controller of FIG. 1.

The phase shift controller 28 is shown in greater detail in FIG. 2, where, as illustrated, power is applied to the controller by way of the transformer 50 from the power source 16. This power is applied across a relay R28, the energization of which is controlled by a normally open contact R10a which is closed at the start of the welding operation, thereby energizing relay R28 to permit operation of the power regulators 24 and 26. Power from the secondary winding 50 is also applied through the parallel windings 52 and 54 which constitute the primary windings of output transformers for controller 28, and through a resistor 56 to a plurality of selectably energizable phase angle controls, generally indicated at 58, 59, 60 and 61. Each of the controls 58–61 is connected across transformer 50 by means of suitable relay contacts whereby a selected one of the controls may be connected to the output windings 52 and 54.

In particular, the controls 58–61 are connected in circuit with the contacts of cycle counting relays whereby a selected control function is obtained for each cycle. Thus, the automatic phase shift sequencer 62 of the present invention is utilized during cycles 1 and 2 of the glass heating operation and is placed in the control circuit by way of a normally open contact R1a of relay R1 and a normally closed contact R3a of relay R3. These relays are in the cycle counting network 42, with relay R1 being energized at the start of cycle 1 to close contact R1a and place the automatic phase shift sequencer in series with the output windings 52 and 54. This allows sequencer 62 to provide the output from phase shift controller 28 during the first and second cycles, whereby the sequencer 62 controls regulators 24 and 26. At the start of the third cycle of operation, contact R3c is shifted to its open position and sequencer 62 is removed from the circuit. At the same time, relay R3 closes its normally open contact R3d in firing circuit 59, placing potentiometer 64 in series with output windings 52 and 54 whereby the setting of potentiometer 64 regulates the current flow through the marginal edge portions of the glass sheet.

At the start of the fourth cycle, relay R4 is energized, opening contact R4c and closing normally open contact R4d in the firing circuit control 60, placing potentiometer 66 in series with the output windings 52 and 54 whereby the setting of this potentiometer regulates the heating of the glass sheet for the next two cycles. At the end of the fifth cycle, relay R6 is energized to shift its contacts, opening contacts R6c to remove firing control 60 from the circuit and closing contact R6d to place firing circuit control 61 in the system. For the remaining cycles of operation, potentiometer 68 serves to control the power regulators and thus the current flow through the marginal edges of the glass sheet. It has been found that potentiometers 64, 66, and 68 may, after initial adjustment, be left at fixed settings to provide optimum heating and welding of the glass sheets.

Figure 4:
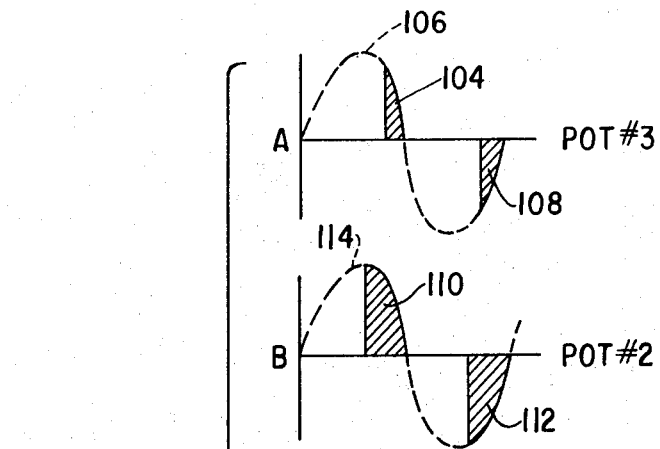
FIG. 4 is a diagrammatic illustration of the current waveforms appearing at the output of the regulator of FIG. 3.
Figure 3:
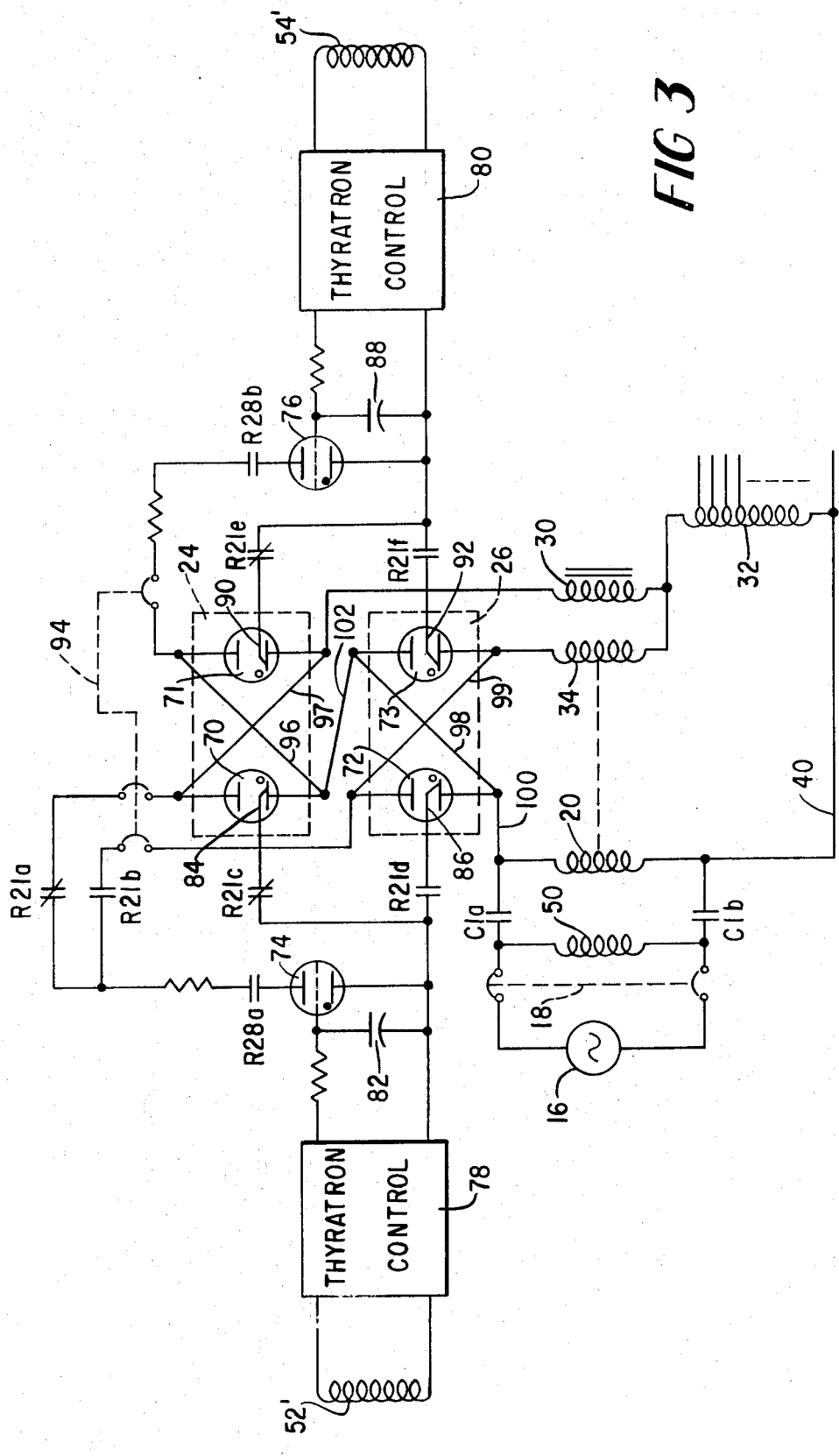
FIG. 3 is a partial schematic diagram of the power regulators of FIG. 1.

The manner in which the potentiometers of the phase shift sequencer 62 and potentiometers 64, 66 and 68 serve to regulate the power supplied by regulators 24 and 26 to the welding transformer may be seen more clearly in FIG. 3, which is partial schematic diagram of a preferred form of the regulators 24 and 26, and by FIG. 4, which illustrates the current flow through the power regulators for various potentiometer settings.

The output windings 52 and 54 of the phase shift controller 28 comprise the primary windings of output transformers having secondary wingings 52' and 54', respectively, which provide the input to the power regulators 24 and 26, one winding providing the input for the positive going portion of the alternating current wave form and the other winding providing the input for the negative going portion of the waveform, whereby a full wave output is obtained from the regulators. The power regulating elements in the long side regulator 24 are, in the present embodiment, a pair of ignitrons, or gas breakdown tubes 70 and 71, which are cross-connected in a parallel opposing circuit to be alternately conductive, and produce a full wave controlled output. In similar manner, the short side power regulator 26 comprises a pair of ignitrons 72 and 73 similarly cross-connected for alternate conduction. The selection of the long side and the short side ignitrons is by means of relay contacts R21a through R21f responsive to a normally de-energized relay R21 which is operated to shift all its contacts when a short side is to be welded.

Conduction of the ignitrons is controlled by a pair of thyratron gas tubes 74 and 76 which are, in turn, controlled by the current level in the secondary windings 52' and 54', respectively, by way of corresponding thyratron control networks 78 and 80. These thyratron control networks include suitable rectifiers to prevent damage to the igniter electrodes of the ignitrons and prevent damaging reverse currents during the half cycles in which the corresponding ignitrons are off. The thyratron control network 78 provides a control voltage, the magnitude of which is determined by the input on transformer secondary winding 52', to charge a timing capacitor 82 which controls the time at which the thyratron fires, and thus controls the phase angle of firing. When the thyratron 74 becomes conductive, it applies a firing voltage to either the igniter electrode 84 of ignitron 70 or the igniter electrode 86 of ignitron 72, depending upon the energization of relay R21, thereby firing the corresponding ignitron.

In similar manner, the current from transformer secondary winding 54' is applied through thyratron control network 82 to a timing capacitor 88, the time constant of which regulates the firing of thyratron 76. When this thyratron fires, it applies a firing voltage to the ingiter electrode 90 of ignitron 71 or to the igniter electrode 92 of ignitron 73, again depending upon the energization of relay R21. Thus, the magnitude of the current applied to transformer windings 52' and 54' determines the time in each alternating current cycle at which thyratrons 74 and 76 will fire, and accordingly, determines the phase angle at which the corresponding ignitrons fire to supply power to the autotransformer 32.

It will be seen that to operate the ignitron circuit of FIG. 3, it is first necessary to energize relay R28 (FIG. 2) which then closes the normally open contacts R28a and R28b in series with the thyratrons 74 and 76, respectively. Thyratron 74 is connected through contact R28a, normally closed contact R21a, and a circuit breaker 94 to the anode of ignitron 70. The cathode of thyratron 74 is connected to the igniter electrode 84 by way of normally closed contact R21c and to the igniter electrode 86 through normally open contact R21d. The anode of thyratron 76 is connected through relay contact R28b and circuit breaker 94 to the anode of ignitron 71 while its cathode is connected by ways of normally closed contact R21e to the igniter electrode 90 and through normally open contact R21f to the igniter electrode 92. The anodes and cathodes of tubes 70 and 71 are cross-connected by way of lines 96 and 97, while the anodes and cathodes of tubes 73 and 74 are cross-connected by lines 98 and 99.

One side of the alternating current source 16 is connected through circuit breaker 18, normally open main contact C1a, and a line 100 to the cathode of ignitron 72. This side of the source is further connected through line 98 and connecting line 102 to the cathode of ignitron 70. The other side of source 16 is connected through circuit breaker 18 and normally open main contact C1b to line 40 through which alternating current power is applied by way of transformer 32 and secondary winding 34 to the cathode of ignitron 73 and by way of transformer 32 and reactor 30 to the cathode of ignitron 71.

The effect of a change in the firing angle of an ignitron is illustrated in FIG. 4 wherein FIG. 4A illustrates the effect of a first potentiometer setting in the phase shift controller network which allows only a small current flow through the transformer windings 52' and 54'. This low control value causes the firing of thyratrons 74 and 76 to be delayed, so that firing occurs near the ends of the positive and negative sweeps of the waveform. When the thyratron finally fires, as indicated by the shaded portion 104 of the waveform 106 in FIG. 4A, it remains conductive until polarity reversal occurs. On the negative half cycle the same delay occurs, so that the other ignitron of the selected pair similarly will not fire until near the end of its half cycle, as indicated by the shaded area 108 of the waveform 106. Thus, this setting of the phase shift controller results in the application of current pulses 104 and 108 to the autotransformer 32, producing a low average current flow therethrough and producing a low welding voltage and current in the glass. The introduction of a second potentiometer, or adjustment of a first potentiometer to a second value, which produces a higher control input to transformers 52' and 54' results in a shifting of the firing angle of the ignitrons, as indicated by the shaded areas 110 and 112 of the waveform 114 in FIG. 4B and a resultant higher average current to the welding electrodes. Again, a further change in the phase shift controller can further advance the firing angles of the ignitrons as indicated by the shaded portions of waveforms 116 and 118 of FIGS. 4C and 4D. By proper settings of a plurality of sequenced potentiometers in accordance with the present invention, the phase angle at which the power regulators are fired may be varied to produce a desired change in the average power flow to the autotransformer and thus to the welding circuit thereby producing a desired heating pattern for the glass.

As indicated in the discussion of FIG. 1, the current trip circuit 46 senses the current flow to the welding transformer 14, and, when a predetermined level of current flow is reached for each step of each cycle of operation, produces a stepping signal which shifts the welding operation to the next adjacent side of the glass. In order to establish a desired current maximum for each cycle, a plurality of reference voltages are set up by the current trip network of FIG. 5 and selected by the cycle counter relays used to keep track of the cycles of the welding operation. Accordingly, the output of the current sensing transformer 44 is applied by way of lines 120 and 122 across an input resistor 124 to the current trip network illustrated in FIG. 5. Line 120 is connected by way of line 126 to a suitable rectifier and filter network to provide a reference voltage on line 130. A plurality of potentiometers 131 through 137, one for each of the seven cycles used in the preferred embodiment of the present welding system, are connected in parallel between lines 120 and 130. Line 122 is connected through a normally closed contact R14a to the primary winding of a transformer 138, the opposite side of which is connected to line 120. The secondary of transformer 138 is connected between line 120 and the anode of a gas diode, the cathode of which is connected to line 120. The anode of the gas diode is connected by way of line 140 through a resistor 142 to a common output line 144 from the adjustable arms of potentiometers 131 through 137.

The adjustable arm of each potentiometer is connected through suitable contacts of the cycle counting relays R2 through R7, the a relay contacts being normally closed and the b contacts being normally open. These contacts are responsive to the cycle counter 42 whereby only one of the potentiometers is connected to the common line 144 for any give heating cycle. These potentiometers are each adjusted for the desired current level in their corresponding cycles, and during the welding operation are sequenced to provide the required control. Whenever the current level detected by transformer 44 exceeds the level preset by the corresponding cycle potentiometer, a voltage detector network 146 is energized to shift the operation to the next marginal edge portion of the glass, as has been explained.

It was noted with respect to the phase shift controller 28 illustrated in FIG. 2 that although cycles 3 through 7 of the normal welding operation utilize fixed current values (and thus fixed firing angles for the power regulators) as determined by the settings of potentiometers 64, 66, and 68, the first two cycles require a different approach since the relatively cool glass has, during the initial period of heating, a relatively high resistance to current flow. Accordingly, in place of a fixed potentiometer, an automatic phase shift sequencer 62 is utilized in cycles 1 and 2 for regulating the firing angle of the power regulators. It has been known in the past to utilize for cycles 1 and 2 a manually adjustable potentiometer positioned at the glass welding location for adjustment by an operator who observes the progress of the welding during the first two cycles and adjusts the potentiometer accordingly to produce the desired welding results. As has been noted, however, such manual operation presents serious difficulties, for not only does it require a very skilled operator to attain optimum results, but in addition it is difficult even with a skilled operator to obtain uniform results each time. Variations in the quality of the window units produced by a manual system become more pronounced when one operator replaces another, as in a change of shifts, where a less skilled operator may replace a more skilled operator. Accordingly, the present invention provides an automatic phase shift sequencer 62 which is illustrated in greater detail in FIG. 6, to which reference is now made.

Figure 6:
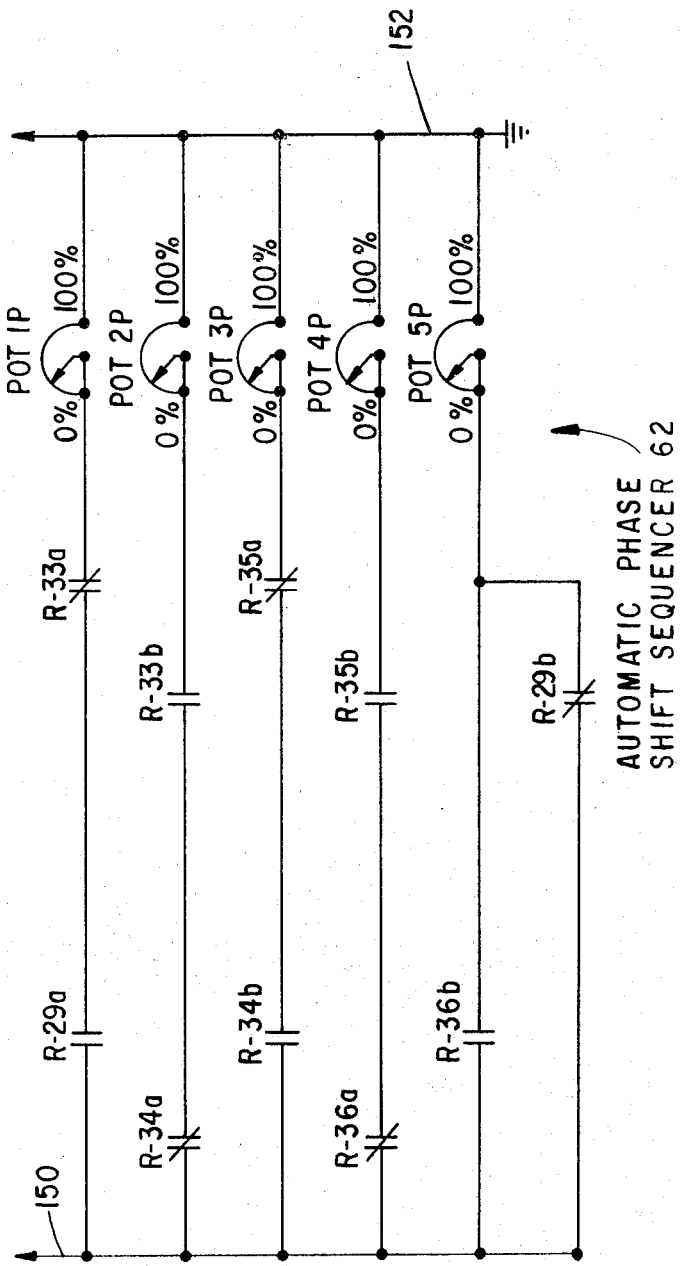
FIG. 6 is a schematic diagram of the automatic phase shift sequencer of FIG. 2.

The phase sequencer 62 comprises a plurality of adjustable potentiometers 1P, 2P, 3P, 4P, and 5P, which are connected through suitable sequencing relay contacts between line 150 and a common line 152. Potentiometer 1P is connected between these two lines by way of normally open relay contact R29a and normally closed contact R33a, with the moveable arm of the potentiometer being adjustable to place a selected resistance in the line. When both R29a and R33a are closed, the resistance value of potentiometer 1P is placed in series with line 150 and, when the automatic phase shift sequencer 62 is selected by the simultaneous closure of relay contacts R1a and R3c (FIG. 2), the resistance value of potentiometer 1P determines the firing angle of the power regulators and thus determines the current level applied to marginal edge portion of the glass being welded. In similar manner, potentiometer 2P is connected across lines 150 and 152 by way of normally closed relay contacts R34a and normally open contact R33b; potentiometer 3P is connected by way of normally open contact R34b and normally closed contact R35l; and potentiometer 4P is connected by way of normally closed contact R36a and normally open contact R35b. As an optional feature in the automatic phase shift sequencer, it may be desirable to retain a manually adjustable operator's potentiometer so that where necessary the automatic phase shift sequencer can be overridden or supplemented. This potentiometer is illustrated in FIG. 6 at 5P, and is connectable across lines 150 and 152 by way of either a normally open contact R36b or a normally closed contact R29b, these contacts being connected in parallel with each other.

It will be seen that where none of the relays R29, R33, R34, R35, or R36 is energized, none of potentiometer 1P through 4P will be connected to line 150, whereas the operator's potentiometer 5P will be connected through the normally closed contact R29b to line 150. However, upon energization of relay R29 the operator's potentiometer is removed from the circuit, and potentiometer 1P replaces it. Subsequent energization of both relay R29 and R33 removes potentiometer 1P from the circuit and replaces it with potentiometer 2P, for the energization of relay R33 shifts both its contacts a and b. Similarly, energization of relays R29, R33 and R34 shifts the corresponding relay contacts and places potentiometer 3P across lines 150 and 152. Subsequent energization of relay R35 removes potentiometer 3P from the circuit and places potentiometer 4P across the lines, and energization of relay R36 shifts the control back to potentiometer 5P. Relay R29 thus serves as the master control for the automatic shift sequencer while relays R33 through R36 operate to sequence potentiometers 1P through 5P, varying the phase angle at which the power regulators fire in accordance with the setting of each potentiometer and thereby producing the desired heating curve in the glass weld.

By setting the potentiometers 1P through 4P to continuously decreasing values and sequencing them while a given pair of electrodes is operative, the firing phase angle is reduced in an incremental fashion and the current supplied to the weld is increased incrementally in the manner generally indicated in FIGS. 4A through 4D. This produces a variable current in the selected edge portion of the glass which increases in a predetermined and repeatable manner. When the maximum current level is reached, the system shifts to the next step, or side portion, and the welding current again is automatically varied in accordance with the setting of the potentiometers. This is repeated for each side of the glass weld for each of the first and second cycles; thereafter, the fixed values determined by potentiometers 64, 66, and 68 are used to regulate the firing angle.

Figure 7A:
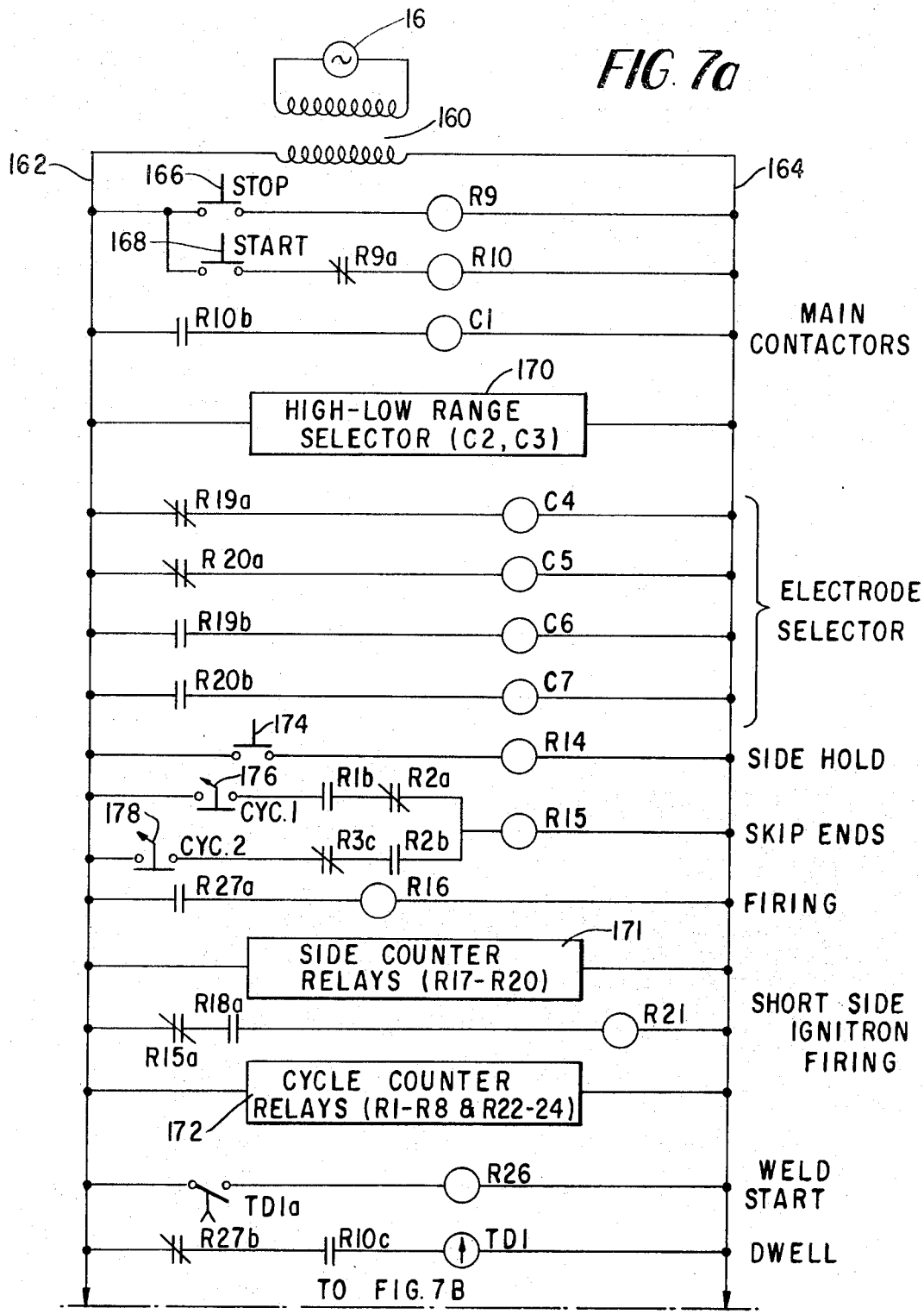
Figure 7B:
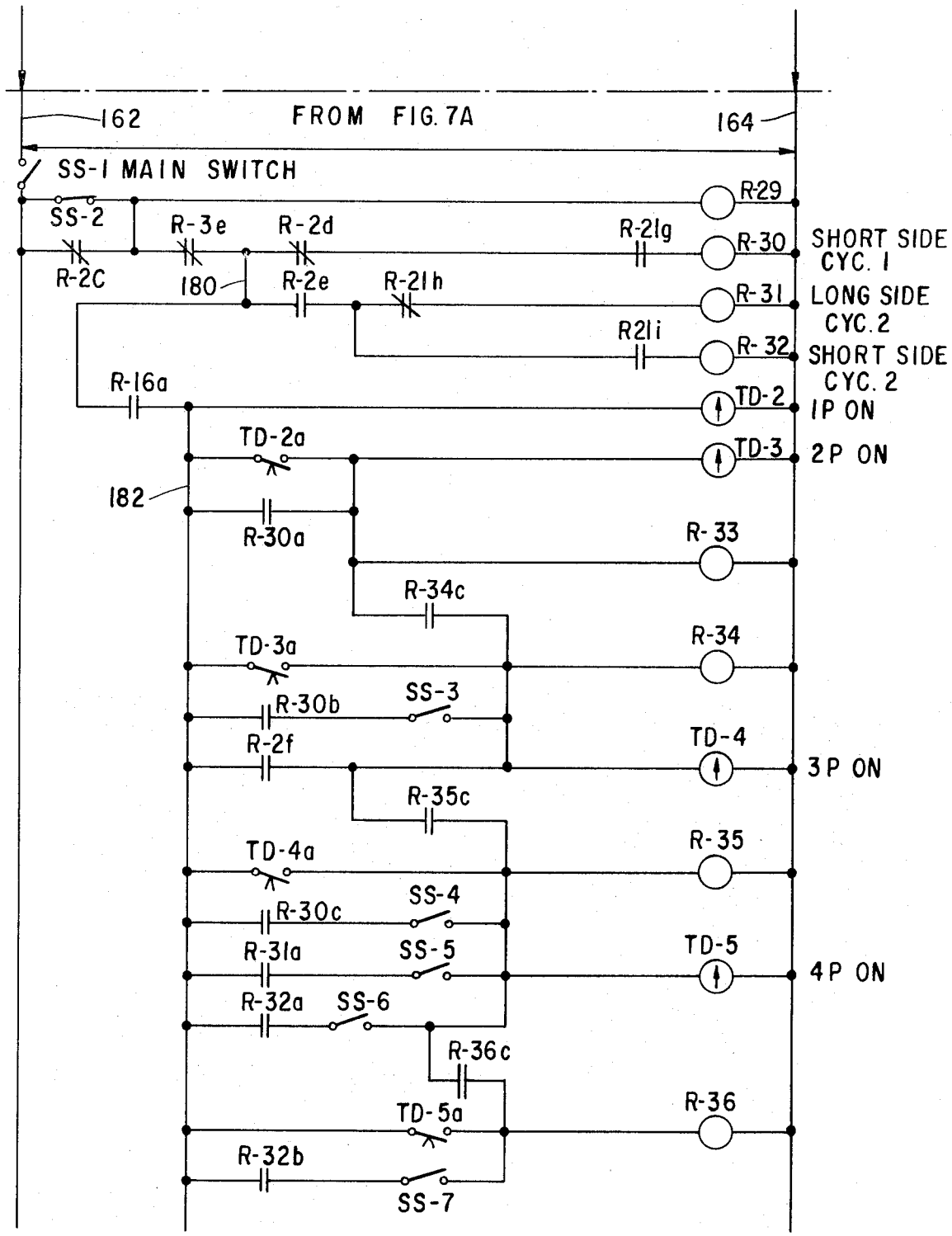

The sequencing of potentiometers 1P through 4P, and for potentiometer 5P if it is used, is accomplished by the relay control circuits of FIGS. 7A and 7B, to which reference is now made. FIG. 7A includes the relay controls for the overall circuit operation, while FIG. 7B in general includes the sequencing relays for the automatic phase shift sequencer 62. As shown in FIG. 7A, the alternating current is applied from power source 16 through the power transformer 160 across lines 162 and 164, between which the control relays are connected. It will be understood that although the relay network illustrated in FIGS. 7A and 7B includes the major features of the present system, a number of auxiliary features, such as safety relays, temperature controllers for the ignitrons, cooling water thermostats, test relays, indicator lights, and the like, have been eliminated in order to simplify the system and make it more readily understandable.

Stop and start switches 166 and 168 are provided for the welding system, these switches being in the form of pushbuttons which energize relays R9 and R10, respectively, by connecting them across lines 162 and 164. Stop relay R9 includes an interlock contact R9a in series with relay R10 to insure that both relays cannot be energized at the same time. When relay R10 is energized by depressing the pushbutton 168, its contact R10b is shifted to the closed position to energize the main contacter relay C1, thereby applying the alternating current voltage to the welding system. One or the other of the high and low range selector relays C2 and C3 is then energized by the network 170, thereby placing either the first or second tap switches 36 and 38 in series with the welding transformer 14 (see FIG. 1). The energization of the relays C2 and C3 is determined by the cycle counter 172 (FIG. 7A) which incorporates a plurality of relays R1 through R8 and R22 through R24 connected in known manner to keep track of and to control the cycle in which the welding system is operating. C2 is operated during the first two cycles, and C3 during the remaining cycles in the embodiment described herein.

A plurality of realys C4 through C7 are energizable by normally closed contacts R19a and R20a and normally open contacts R19b and R20b, respectively, responsive to side counter relays R19 and R20. When both relays R19 and R20 are de-energized, relays C4 and C5 are energized through contacts R19a and R20a, whereby contacts C4a and C5a (FIG. 1) are closed to apply a welding voltage to electrodes A and B. When the side counter is shifted to the next step, relay R19 is energized to shift its contacts and relay coils C5 and C6 become energized and relay C4 becomes de-energized, whereby welding voltage is applied across electrodes B and C. Similarly, energization of both relays R19 and R20 applies welding voltage across marginal edge portion C–D of the glass sheet while energization of relay R20 and de-energization of relay R19 places the welding voltage across electrodes D and A.

If, during the automatic operation of the present system, the operator determines that for some reason a weld is not complete, a side hold pushbutton 174 is provided which permits an override of the stepping operation by disabling the current tripping network 46. Thus, by depressing switch 174 the operator energizes relay R14 to open relay contact R14a (FIG. 5), thereby preventing the current trip network from detecting the current level in the welding transformer. When this is the case, the current flow through the marginal edge portion being welded is continued until the operator releases the pushbutton 174 and contact R14a recloses to place the current trip network back in the circuit.

Since the ends of the window units are generally shorter than the sides, occasionally it is found to be unnecessary to heat the ends on every cycle of the welding operation. Accordingly, a relay R15 is provided which, when energized, causes the side counter to operator in such a manner that no current is passed through sides B–C or D–A. As illustrated, a toggle switch 176 may be provided to cause relay R15 to be energized during the second heating cycle. Contacts R1b, R2a, R3c, and R2b are provided to enable one or both of the toggle switches 176 and 178 to operate coil R15 during the first or second cycles.

The voltage detector circuit 146 which forms a part of the current trip network 46 incorporates a flip-flop circuit (not shown) which is responsive to a current tripping signal to shift momentarily from a steady state condition to an unstable condition, at which time it produces a signal which operates the side counter relays to shift the welding current from one marginal edge portion (step) of the glass to the next. During the steady state of the voltage detector flip-flop, a relay R27 is energized, its contacts R27a closed, and a relay R16 is energized; when a current trip condition occurs, R27 is de-energized and R27a is opened momentarily to de-energize R16. Contacts R27b in series with a dwell time delay TD1 are momentarily closed and, with relay R10 energized during normal operation and contacts R10b consequently closed, TD1 is energized to initiate a dwell timing sequence to insure a delay between the current trip condition and the start of the next cycle. At the end of the preset delay, relay TD1 times out and its corresponding contact TD1a closes to energize relay R26, which is the weld starting relay. Energization of this relay allows the flip-flop in the voltage detector to return to its stable condition, whereby R27 returns to its energized condition, thereby energizing R16 and initiating the next heating step.

Relay R21, which controls the firing of the short side ignitron power regulator by shifting relay contacts R21a through R21f (FIG. 3), is connected in series with the normally closed contact R15a and the normally open contact R18a. Contact R15a is opened only when relay R15 is energized to indicate that the ends of the glass are to be skipped, in which case the short side power regulator is not required. When the ends are to be heated in the normal heating cycle, the side counter relay R18 will be energized at the appropriate time to close contact R18a and shift the contacts of relay R21 so that the power regulator 26 is placed in circuit with the autotransformer 32 in place of the long side power regulator R24.

The sequencing relays for the automatic phase shift sequencer of FIG. 6 are diagrammed in FIG. 7B, wherein a main switch SS–1 is provided in the power line 162 to permit the automatic sequencer to be removed from the circuit, if desired. When this switch is open, therefore, the relay control network of FIG. 7B is removed from the phase shift controller system and phase control of the power regulators reverts to a manual control by the operator's potentiometer 5P (FIG. 6) through the normally closed contact R29b. Relay R29 is shown in FIG. 7B as being connected across power lines 162, 164 by way of normally closed switch SS–2 or the normally closed contact R2c which is connected in parallel with switch SS–2. It will be recalled that relays R1 through R7 are cycle counting relays which are energized during their corresponding cycles. Thus, during the first heating cycle, relay R2 is not energized and therefore contact R2c remains closed; however, on the second cycle of operation, R2 is energized to open contact R2c and thereby open one of the energization paths to relay R29. The switch SS–2 is a cycle skip switch and when opened, causes relay R29 to be de-energized on the second heating cycle, thus placing control of the heating current during cycle 2 on the operator's potentiometer 5P. Since, in the present embodiment, the automatic phase shift sequencer is to be operative only during the first two cycles, relay contact R3e is connected in series between the parallel arrangement of switch SS–2 and contact R2c and the remainder of the relay network, so that at the start of the third cycle and the consequent energization of relay R3, the relay network is disabled.

During the first and second heating cycles, with either or both of switch SS–2 and contact R2c closed, power is applied through normally closed contact R3e to power line 180 to energize selected ones of relays R30, R31, and R32. These relays are energized when heating currents are applied to the short sides of the glass sheet during cycle 1, the long sides during cycle 2, or the short sides during cycle 2, respectively, to modify the operation of the remainder of the relay network as will be described. The cycle 1 short side relay R30 is connected between lines 180 and 164 by normally closed contact R2d and normally open contact R21g. Since R21 is the short side relay, and is energized only when the short side of the glass is to be heated, and since relay R2 is energized during the second cycle, it will be apparent that R30 can be energized during cycle 1 only and only when the short sides of the glass are being heated. Similarly, the cycle 2 long side relay R31 is connected to line 180 by way of normally closed relay contact R21h and normally open cycle relay contact R2e, and the cycle 2 short side relay R32 is connected to line 180 through normally open contact R21i and normally open contact R2e. Accordingly, relays R31 and R32 can be energized only during the second cycle. with the particular relay energized being dependent upon whether the short side relay R21 is energized.

The actual firing of the power regulators is controlled by the relay R16 which is energized only when the voltage detector relay R27 (FIG. 5) is energized to indicate that the system is ready for the welding operation. Relay R16 is thus de-energized and reenergized between each heating step, with the dwell time delay timer DT1 regulating, through relays R26 and R27, the off time between successive applications of power, or duty cycles, of the power regulator. Energization of relay R16, therefore, indicates that the welding system is ready for the next sequencing operation of the automatic phase shift sequencer 62. Accordingly, contact R16a is closed to connect power from line 180 to line 182.

At the start of the heating operation, with main switch SS-1 closed and firing relay R16 energized, power is applied to relay R29 to close its contacts R29a (FIG. 6) and to place potentiometer 1P across lines 150 and 152 of the phase shift controller 28 (FIG. 2), whereby the setting of this potentiometer regulates the firing angle of the power regulator 24 to control the effective current along the side A-B of the glass window. At the same time, timer TD2 (FIG. 7B) is energized to control the length of time potentiometer 1P remains in the circuit. When timer TD2 times out, its contact TD2a closes to connect timer TD3 across lines 182 and 164 for energization and further energizes relay R33. This opens relay contact R33a (FIG. 6) and closes contacts R33b, thereby replacing potentiometer 1P with potentiometer 2P to thereby adjust the firing angle of the power regulator 24 in accordance with the setting of potentiometer 2P. This potentiometer remains in the control circuit until timer TD3 times out, causing contact TD3a to close and energize timer TD4 and relay R34, opening contact R34a (FIG. 6) to remove potentiometer 2P from the control circuit and closing contact R34b to connect potentiometer 3P across lines 150 and 152. Relay R34 also closes its contact R34c (FIG. 7B) to maintain the energization of relay R33 to hold potentiometer 1P out of the control circuit.

When the timer TD4 times out, its contact TD4a is closed to energize relay R35 and start timer TD5. The energization of relay R35 opens its contacts R35a to remove potentiometer 3P from the circuit, closes it contact R35b so that potentiometer 4P is placed in control of the firing angle of the power regulator, and closes contact R35c to hold relay R34 in its energized state and prevent potentiometers 1P and 2P from affecting the controller. When TD5 times out, it closes its contact TD5a to energize relay R36 which shifts its contacts to open R36a and remove potentiometer 4P from the control circuit, replacing it with the manually controlled operator's potentiometer 5P by way of relay contact R36b. Again, contact R36c holds relay R35 to prevent potentiometers 1P, 2P or 3P from affecting the control circuit. The operator's potentiometer remains in control of the power regulator until the current level through side A-B reaches the trip level, at which time the current trip circuit 46 produces a signal at the voltage detector 146 which de-energizes relay R27, opening contact R27a and de-energizing R16, thereby removing power from lines 182 and resetting the relay system of FIG. 7B. The side counter relays generally indicated in FIG. 7A are then operated to shift the system to the side B-C of the glass sheet.

Since B-C is a short side, the relay R21 is now energized to disconnect power regulator 24 and connect regulator 26 into the welding system. At the same time, contact R21g (FIG. 7B) is closed to energize relay R30. At the end of the dwell time set by timer TD1, relay R16 is re-energized and the second step of the first heating cycle commences. Again, relay R29 and time delay TD2 are energized, but since relay R30 is also energized, the normally open contacts R30a are closed to bypass contact TD2a. Accordingly, relay R33 and timer TD3 are immediately energized, without waiting for TD2 to time out, placing potentiometer 2P in the control circuit. The energization of relay R30 also closes contact R30b which is in series with a selector switch SS-3. This switch, when closed, energizes relay R34 and time delay TD4 to bypass relay R33 and timer delay TD3, thereby permitting the short side to be initially heated under the control of potentiometer 3P. Similalry, a switch SS-4 in series with relay contact R30c is provided to permit the short side heating sequence to start on potentiometer 4P by initially energizing relay R35 and timer TD5. Accordingly, on the short side heating steps of cycle 1, potentiometer 1P is skipped, and if switches SS-3 and SS-4 are closed, potentiometers 2P and 3P may also be skipped.

Figure 5:
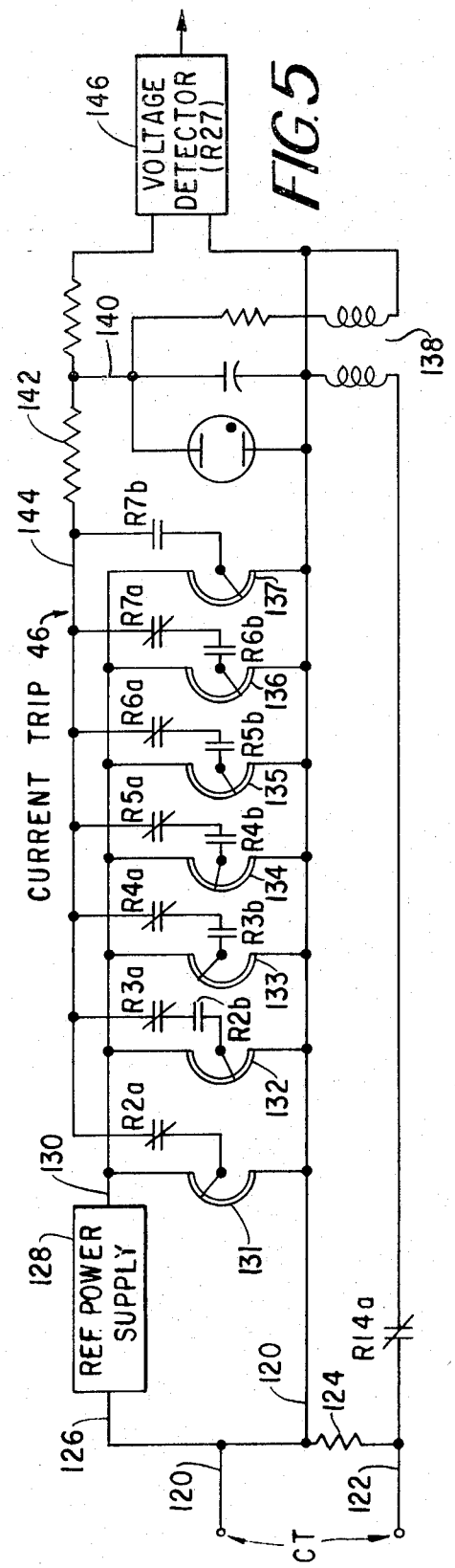
FIG. 5 is a partially schematic and partially diagrammatic illustration of the current trip circuit of FIG. 1.

On the cycle 1, short side step, the selected timer TD3, TD4, or TD5 times out and shifts the control to the next higher potentiometer, and its corresponding timer in the manner described above, with this sequence continuing as before until a current trip signal is produced at the voltage detector 146 (FIG. 5). When trip occurs, the said counter relays shift to the third step, which is side C-D of the glass, and relay R16 is de-energized to reset the sequencing relays of FIG. 7B. Short side relay R21 is de-energized, and after time delay timer TD1 has timed out, potentiometers 1P through 5P are sequenced as described with respect to side A-B to vary the firing angle of the regulator 24 in accordance with the settings of these potentiometers, producing the desired heating curve in side C-D. When current trip occurs, the system is reset and again the side counter relays energize relay R21 to repeat the short side sequence for side D-A. The current trip which occurs at the end of the fourth heating step, at side D-A of the glass, completes the first cycle, and the stepping of the side counter relays 171 then operates the cycle counter 172 to energize relay coil R2 and set the system up for the second automatic cycle.

Energization of relay R2 opens contacts R2c and R2d while closing contact R2e, thereby removing relay R30 from the control circuit and permitting energization of either relay R31 and R32. Since the side counter relays 171 have now stepped back to the first side, which is the long side A-B, relay R31 is energized. Upon closure of relay contact R16a the second heating cycle begins. As before, relays R29 and TD2 are energized, but because of the energization of cycle relay R2, contact R2f is now closed to energize timer TD4 and relay R34, thus placing potentiometer 3P in the control circuit. The energization of R34 removes potentiometer 2P from the circuit, while contact R34c energizes relay R33 to remove potentiometer 1P from the control circuit. Thus, the second cycle automatically starts under the control of potentiometer 3P, porducing a higher effective initial current to the glass.

Although timers TD2 and then TD3 continue to operate in the previously discussed way, the energization of relays R33 and R34 prevent them from having any effect on the control circuit. When timer TD4 times out, however, relay R35 and timer TD5 are energized to sequence the control to potentiomer 4 and when TD5 times out, control is shifted to potentiometer 5P until current trip occurs. It will be noted that because relay R31 is energized during the long side heating step in cycle 2, relay R31b is closed, so that selector switch SS–5 can be closed to directly energize relay R35 and timer TD5, whereby the second cycle long side heating can be started on potentiometer 4P, if desired.

When the tripping current is attained in side A–B, cycle 2, the system is stepped to the short side B–C to energize relay R32. Upon closure of contact R16a, the now-closed contacts R2f serve to energize timer TD4 and relays R34 and R33 as before, but because relay R32 is energized on the short side heating step of cycle 2, relay contact R32a allows a selector switch SS–6 to be used to immediately energize timer TD5 and relay R35, if so desired, so as to start the control on potentiometer 4P. When this is done, it will be noted that relay R35 opens contacts R35a to remove potentiometer 3P from the circuit and closes its contacts R35c to permit energization of relay R34 which, in turn, closes contact R34c to energize relay R33, thereby removing potentiometer 1P and 2P from the control circuit Similarly, if desired, a switch SS–7 is provided in series with a contact R32b whereby the short side step of the second cycle can be started on the fifth potentiometer by directly energized relay R36, the energization of this relay serving to hold potentiometers 1P through 4P out of the control circuit by way of contacts R36c, R35c, and R34c. Again, the occurrence of a predetermined maximum current for this step of the second cycle will produce a current trip which will reset the relays of FIG. 7B and advance the side counter relays to the long side C–D.

The process of heating side C–D duplicates that of the heating step of side A–B second cycle, after which a current trip shifts the system to the short side D–A. Again, the heating of side D–A proceeds in accordance with the options selected for side B–C and upon occurence of a current trip the side counter relays are shifted and the cycle counter 172 shifts to cycle 3. When this occurs, relay contact R3e is opened and the circuitry of FIG. 7B is removed from the control system so that the relays and contacts in the automatic sequencer are made inoperative.

As illustrated in FIG. 2, when relay R3 is energized at the start of the third cycle, the automatic phase shift sequencer 62 no longer controls the phase angle of the power regulators and for the remaining cycles the potentiometers 64, 66 and 68 are operable with the current trip circuit to provide the required control. At the end of the selected number of cycles, the glass has reached the desired welding temperature and the edges of the upper and lower sheet are fused to produce a multiple glazed window unit.

Thus, the present system provides an automatic sequencing means for controlling the phase angle at which the current regulators switch to their conductive states so as to provide an accurate control over the effective power applied to the welding electrodes of a glass welding system. The automatic sequencer applies a low initial voltage to the glass that is to be welded to prevent flashover and permits a progressive, sequential, incremental increase in the heating current applied to each side of the glass in turn, whereby each edge of the glass is heated gradually but uniformly, and wherein the exact heating steps can be repeated for each window unit to be welded so that optimum results are obtained each time.

To accomodate various sizes of window units and to permit compensation for various characteristics of the glass being used, the system is provided with a number of variables which permit selection of the exact heating curve required for the particular glass and marginal edge being heated. Thus, the long sides of a glass may be heated in accordance with a different pattern that the short sides, and in some circumstances it may be found that selected cycles of heating may be completed skipped. In addition to various switches which allow selection or elimination of potentiometers and timers which regulate the operation of the system, the potentiometers and timers themselves are adjustable to allow a considerable variation in the amount of current applied at any given increment in the heating sequence and to regulate the length of time during which that current level is applied. The phase shifter of the present invention automatically operates through the first two heating cycles of a glass welding operation to provide variable phase shifting of the firing angle of the power regulators whereby preselected heating curves may repetitively be applied to the glass, whereby an improved and uniform quality of weld is obtained. Although the invention has been described in terms of a preferred embodiment thereof, it will be apparent to those of ordinary skill in the art that numerous modifications and variations may be made without departing from the true spirit and scope thereof as set forth in the following claims.

What is claimed is:

1. In a glass welding apparatus for forming multiple glazed window units, an electrical welding circuit including at least two spaced electrodes adjacent the glass to be welded and regulator means for regulating the current flow between said electrodes and thereby the heating of said glass, said welding circuit comprising:

a source of alternating current power connected through said regulator means to said electrodes;

phase shift means for varying the effective current flow through said regulator means, said phase shift means including automatic phase shift sequencer means connected to said regulator to vary said current flow through said regulator incrementally through a predetermined sequence of current levels whereby the current to said electrodes is automatically varied to heat said glass in accordance with a predetermined and repeatable heating pattern.

2. The glass welding apparatus of claim 1, wherein said automatic phase shift sequencer means includes a plurality of current selectors, and means for sequentially connecting said current selectors to said regulator means.

3. The glass welding apparatus of claim 2, wherein said current selectors comprise potentiometers.

4. The glass welding apparatus of claim 2, wherein said means for sequentially connecting said current selectors comprises timer means for each selector, said timer means serving to connect each current selector to said regulator means for a predetermined period of time.

5. The glass welding apparatus of claim 4, wherein each current selector comprises an individually adjustable potentiometer.

6. The glass welding apparatus of claim 5, wherein said timer means for each selector comprises a time delay relay operable to control the connection of its corresponding potentiometer to said regulator means.

7. The glass welding apparatus of claim 6, wherein said automatic phase shift sequencer includes at least four potentiometers each being individually adjustable to produce a corresponding effective current flow through said regulator means, and wherein said timer means connects each of said potentiometers sequentially fo a predetermined period of time to said regulator means.

8. The glass welding apparatus of claim 7, further including switch means for bypassing selected potentiometers.

9. The glass welding apparatus of claim 8, further including cycle means for sequentially connecting selected ones of said potentiometers to said regulator means in a first combination for a first cycle of heating said glass and for thereafter sequentially connecting selected ones of said potentiometers to said regulator means in a second combination for a second cycle of heating said glass.

10. The glass welding apparatus of claim 9, further including current trip means responsive to the current flow to said electrodes for terminating said current flow when the current reaches a predetermined value.

11. In a glass welding apparatus for forming multiple glazed window units, an electrical welding circuit including four electrodes, one adjacent each corner of a glass sheet to be heated, regulator means for regulating the current flow to said electrodes, and stepping means for directing said current flow to selected electrode pairs whereby selected marginal edge portions of said glass sheet are heated, said welding circuit further including:
a source of alternating current power connected through said regulator means to a selected electrode pair;
phase shift means for varying the effective current flow through said regulator means, said phase shift means including automatic phase shift sequencer means connected to said regulator to vary said current flow incrementally through a predetermined sequence of current levels, whereby the current to a selected electrode pair is automatically varied to heat said glass in accordance with a predetermined and repeatable heating curve.

12. The glass welding apparatus of claim 11, wherein said stepping means and said phase shift means cooperate to supply said predetermined sequence of current levels sequentially to each of said selected electrode pairs whereby each marginal edge portion of said glass is heated in accordance with said predetermined heating curve.

13. The glass welding apparatus of claim 11, further including cycle means for heating each marginal edge portion of said glass sheet in accordance with a first predetermined and repeatable heating curve to complete a first heating cycle and for varying said automatic phase shift sequencer to heat each of said marginal edge portions of said glass sheet in accordance with a second predetermined and repeatable heating curve to complete a second heating cycle.

14. The glass welding apparatus of claim 13, wherein said automatic phase shift sequencer comprises a plurality of individually adjustable current selectors, and means for sequentially connecting said current selectors to said regulator means.

15. The glass welding apparatus of claim 14, wherein said means for sequentially connecting said current selectors comprises timer means for each selector, each said timer means serving to connect its current selector to said regulator means for a predetermined period of time.

16. The glass welding apparatus of claim 15, wherein the timer means for each selector comprises a time delay relay operable to control the connection of its corresponding selector to said regulator means.

17. The glass welding apparatus of claim 16, wherein said automatic phase shift sequencer includes at least two current selectors, each current selector being a potentiometer adjustable to produce a corresponding effective current flow through said regulator means, and wherein said timer means connects each of said potentiometers sequentially for a predetermined period of time to said regulator means.

18. The glass welding apparatus of claim 17, further including switch means for bypassing selected potentiometers on selected heating cycles.

19. The glass welding apparatus of claim 18, wherein said switch means comprise relays.

20. The glass welding apparatus of claim 14, wherein said means for sequentially connecting said current selectors comprises a relay network operable in a predetermined pattern to connect and disconnect said current selectors to produce a predetermined heating curve in said glass.

21. The glass welding apparatus of claim 14, wherein said regulator means includes phase controlled discharge devices, and wherein said automatic phase shift sequencer controls the phase angle of conduction of said discharge devices to control the effective current delivered to said selected electrode pairs.

22. In a method of heating a marginal edge portion of a sheet of glass to a fusing temperature,
locating a pair of spaced electrodes adjacent said marginal edge portion;
supplying alternating current power to said electrodes in a plurality of cycles to heat said marginal edge portion;
automatically varying the phase angle of the current flow to said electrodes during at least a first of said cylces to vary the temperature of said marginal edge portion in accordance with a predetermined heating pattern; and
automatically supplying a preselected current flow to said electrodes for each succeeding cycle to heat said marginal edge portion gradually and uniformly.

23. The method of claim 22, wherein the step of automatically varying said current flow during said first cycle comprises:
presetting a plurality of current selectors to produce selected current levels at said electrodes; and
sequentially connecting said selectors to a regulator means for controlling the current flow to said electrodes.

24. The method of claim 23, wherein the step of automatically varying said current flow to said electrodes further comprises:
cyclically and automatically varying said current flow during at least two cycles by varying the connection of said selectors to said regulator, whereby the current flow to said electrodes during a first cycle differs from the current flow during a second cycle.

* * * * *

UNITED STATES PATENT OFFICE
CERTIFICATE OF CORRECTION

Patent No. 3,847,584      Dated November 12, 1974

Inventor(s) Lloyd Houser and William G. Jeffries

It is certified that error appears in the above-identified patent and that said Letters Patent are hereby corrected as shown below:

Column 19, Claim 7, line 15, "fo" should be --for--

Signed and sealed this 11th day of February 1975.

(SEAL)
Attest:

RUTH C. MASON
Attesting Officer

C. MARSHALL DANN
Commissioner of Patents
and Trademarks